(12) United States Patent
Pitzer et al.

(10) Patent No.: US 11,148,710 B2
(45) Date of Patent: Oct. 19, 2021

(54) PLUNGER ASSEMBLY FOR A POWER STEERING SYSTEM

(71) Applicant: R.H. SHEPPARD CO., INC., Hannover, PA (US)

(72) Inventors: Jared Pitzer, Red Lion, PA (US); Eric Geib, Auburn Hills, MI (US); Jeffrey Tipton, Gettysburg, PA (US)

(73) Assignee: R.H. SHEPPARD CO., INC., Hannover, PA (US)

(*) Notice: Subject to any disclaimer, the term of this patent is extended or adjusted under 35 U.S.C. 154(b) by 28 days.

(21) Appl. No.: 16/617,995

(22) PCT Filed: May 31, 2018

(86) PCT No.: PCT/US2018/035354
§ 371 (c)(1),
(2) Date: Nov. 27, 2019

(87) PCT Pub. No.: WO2018/222845
PCT Pub. Date: Dec. 6, 2018

(65) Prior Publication Data
US 2020/0189652 A1    Jun. 18, 2020

Related U.S. Application Data

(60) Provisional application No. 62/513,023, filed on May 31, 2017.

(51) Int. Cl.
*B62D 5/06* (2006.01)

(52) U.S. Cl.
CPC .............. *B62D 5/061* (2013.01); *B62D 5/06* (2013.01)

(58) Field of Classification Search
CPC .................................. B62D 5/061; B62D 5/06
(Continued)

(56) References Cited

U.S. PATENT DOCUMENTS 1,877,701 A * 9/1932 Barker ................... B22D 29/00
                                                                91/410
2,456,236 A * 12/1948 Acton ..................... F15B 15/24
                                                                91/403
(Continued)

FOREIGN PATENT DOCUMENTS

CN   109318983 A  *  2/2019
DE      3245186 A1 *  6/1984  .............. F15B 15/24
(Continued)

OTHER PUBLICATIONS

International Search Report for PCT/US2018/035354 dated Aug. 30, 2018, 5 pages.

*Primary Examiner* — Minnah L Seoh
*Assistant Examiner* — Myles A Harris
(74) *Attorney, Agent, or Firm* — Warner Norcross + Judd LLP

(57) ABSTRACT

A plunger assembly for a power steering system comprises a plunger and a tappet. The plunger is disposed within and longitudinally movable along a plunger passageway in a housing of the power steering system. The tappet is disposed within and longitudinally movable along a port defined by the housing. The port is disposed at an angle with respect to the plunger passageway within the housing. The port communicates with the plunger passageway and an area exterior of the power steering system. A power steering system and method of setting the same are also disclosed.

18 Claims, 5 Drawing Sheets

(58) Field of Classification Search
USPC .................................................... 180/426
See application file for complete search history.

(56) References Cited

U.S. PATENT DOCUMENTS

| | | | | |
|---|---|---|---|---|
| 2,606,532 | A | * | 8/1952 | Ziskal ............... F15B 15/24 |
| | | | | 91/404 |
| RE24,892 | E | * | 10/1960 | Banker ............ F15B 13/022 |
| | | | | 137/101 |
| 3,103,828 | A | * | 9/1963 | Strauss ............... B60K 28/00 |
| | | | | 477/99 |
| 3,896,618 | A | * | 7/1975 | Smith ................. F15B 11/17 |
| | | | | 60/405 |
| 4,159,784 | A | * | 7/1979 | d'Autry ............. G01F 11/023 |
| | | | | 222/309 |
| 4,953,651 | A | * | 9/1990 | Lescaut ................ B62D 5/06 |
| | | | | 180/441 |
| 4,970,943 | A | * | 11/1990 | Salg ................... B62D 5/061 |
| | | | | 180/400 |
| 5,454,290 | A | * | 10/1995 | Cortes Guasch ...... B62D 5/061 |
| | | | | 180/402 |
| 5,803,201 | A | | 9/1998 | Sheppard |
| 5,868,216 | A | * | 2/1999 | Eberhart ............... B62D 5/12 |
| | | | | 180/428 |
| 6,193,009 | B1 | * | 2/2001 | Chino ................. B62D 5/062 |
| | | | | 137/599.01 |
| 6,318,232 | B1 | * | 11/2001 | Lemke ............... B62D 5/061 |
| | | | | 91/375 A |
| 6,929,088 | B2 | * | 8/2005 | Wienecke ............ B62D 5/083 |
| | | | | 137/625.31 |
| 8,091,449 | B2 | | 1/2012 | Fuchigami et al. |
| 8,469,139 | B2 | * | 6/2013 | Sheppard ............ B62D 5/061 |
| | | | | 180/441 |
| 8,746,740 | B2 | | 6/2014 | Tanaka |
| 9,415,795 | B2 | * | 8/2016 | Hagiwara ............ B62D 1/187 |
| 9,511,797 | B2 | * | 12/2016 | Sunaga ................ B62D 5/061 |
| 9,802,697 | B2 | * | 10/2017 | Liegeois .............. B64C 25/505 |
| 2001/0013368 | A1 | * | 8/2001 | Igawa .................. B62D 5/06 |
| | | | | 137/625.23 |
| 2018/0009471 | A1 | * | 1/2018 | Novacek .............. B62D 5/075 |
| 2019/0168802 | A1 | * | 6/2019 | Matsumura ............ B62D 5/06 |
| 2019/0308660 | A1 | * | 10/2019 | Yoda .................. B62D 5/062 |

FOREIGN PATENT DOCUMENTS

| | | | | |
|---|---|---|---|---|
| DE | 19650476 | C1 | * | 5/1998 ............ B62D 5/062 |
| DE | 102004037282 | A1 | * | 2/2006 ............ F15B 15/224 |
| EP | 0937206 | B1 | * | 6/2001 ............ B62D 5/12 |
| EP | 1112910 | A2 | * | 7/2001 ............ B62D 5/09 |
| EP | 2862784 | A1 | | 4/2015 |
| FR | 2240076 | A1 | * | 3/1975 ............ B23Q 16/001 |
| GB | 1180516 | A | * | 2/1970 ............ F15B 15/24 |
| GB | 2102753 | A | * | 2/1983 ............ B62D 5/061 |
| JP | 57158161 | A | * | 9/1982 ............ B62D 5/06 |
| JP | 61115775 | A | * | 6/1986 ............ B62D 5/06 |
| JP | 2014184848 | A | * | 10/2014 ............ B62D 5/061 |
| WO | WO-9504219 | A1 | * | 2/1995 ............ F04C 15/06 |
| WO | WO-2004013496 | A1 | * | 2/2004 ............ F15B 15/1447 |
| WO | WO-2014148219 | A1 | * | 9/2014 ............ B62D 5/061 |

* cited by examiner

PLUNGER ASSEMBLY FOR A POWER STEERING SYSTEM

CROSS-REFERENCE TO RELATED APPLICATION

This application is the National Stage of International Application No. PCT/US2018/035354 filed on May 31, 2018, which claims priority to U.S. Application No. 62/513,023, filed May 31, 2017, the contents of which are hereby incorporated by reference.

FIELD OF THE INVENTION

The present invention relates to a plunger assembly and, more particularly, to a plunger assembly used in a hydraulic power steering system.

BACKGROUND

Power steering systems using hydraulic pressure to assist steering the wheels of a vehicle are known in the art. An input steering shaft of known power steering systems is connected to a piston disposed in a chamber defined by a housing; rotational motion of the input steering shaft moves the piston along the chamber. A hydraulic fluid is disposed in the chamber and is used to provide an additional pressure force moving the piston along the chamber. Motion of the piston imparts motion to an output shaft, which steers the wheels of the vehicle.

Such a power steering system is described in U.S. Pat. No. 5,803,201 and shown generally in FIG. 1. In the power steering system 100, the input steering shaft 110 extends through a bearing cap 120 disposed on an end of the body 130, the bearing cap 120 and the body 130 form the housing 120, 130 defining the chamber 140. Hydraulic pressure builds in either the first portion 140a or the second portion 140b of the chamber 140 to assist motion of the piston 150 in either direction within the chamber 140.

As the piston 150 is moved by the input steering shaft 110, to prevent a wheel knuckle on an axle of the power steering system from hitting an axle stop under hydraulic pressure, the power steering system 100 includes a plunger 160 disposed in a bore 170a, 170b at each end of the chamber 140. The plunger 160 engages a valve 152 of the piston 150 as the piston 150 nears an end of travel at each end of the chamber 140 corresponding to the axle stop; engagement of valve 152 relieves increased pressure in one of the first portion 140a and the second portion 140b, lessening the applied hydraulic pressure.

The position of each plunger 160 within each bore 170a, 170b must be reset when axle stop settings or tire sizes of the vehicle are changed. To re-position the plunger 160 in the known power steering system 100, a user drives a punch into the bore 170a, 170b from an area exterior of the power steering system 100, the punch moving the plunger 160 further into the chamber 140. The progression of vehicle technology increasingly requires electronic components to be incorporated within existing vehicle systems. To incorporate electronic components into the known power steering system 100, components related to the input steering shaft 110 must be positioned within the bearing cap 120 at the location of the bore 170a. The known power steering system 100 consequently cannot accommodate required electronic components while permitting resetting of the plunger 160 position.

SUMMARY

A plunger assembly for a power steering system comprises a plunger and a tappet. The plunger is disposed within and longitudinally movable along a plunger passageway in a housing of the power steering system. The tappet is disposed within and longitudinally movable along a port in the housing. The port is disposed at an angle with respect to the plunger passageway within the housing. The port communicates with the plunger passageway and an area exterior of the power steering system.

BRIEF DESCRIPTION OF THE DRAWINGS

The invention will now be described by way of example with reference to the accompanying figures, of which.

DETAILED DESCRIPTION OF THE EMBODIMENTS

Figure 1:
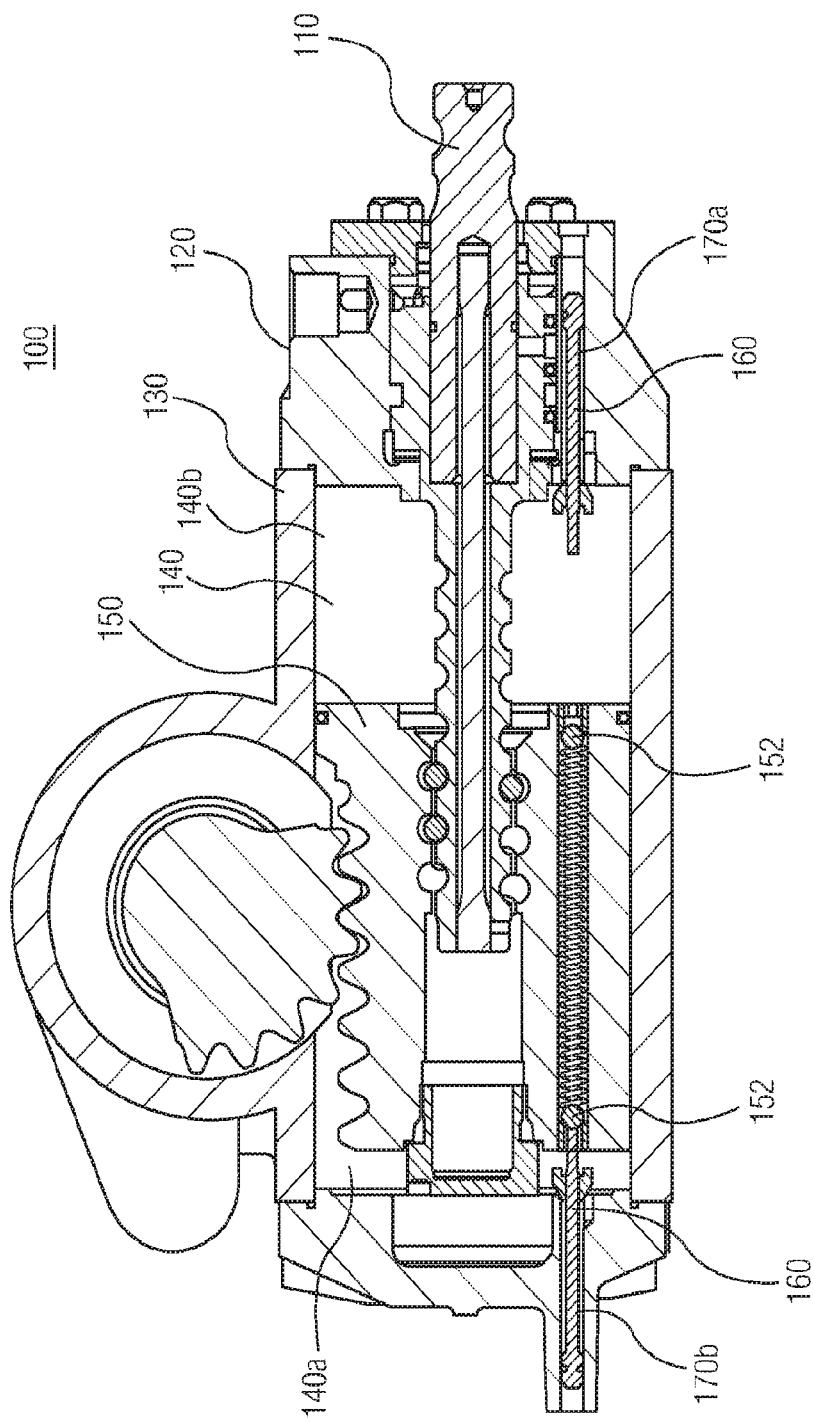
FIG. 1 is a sectional view of a known power steering system.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Figure 2:
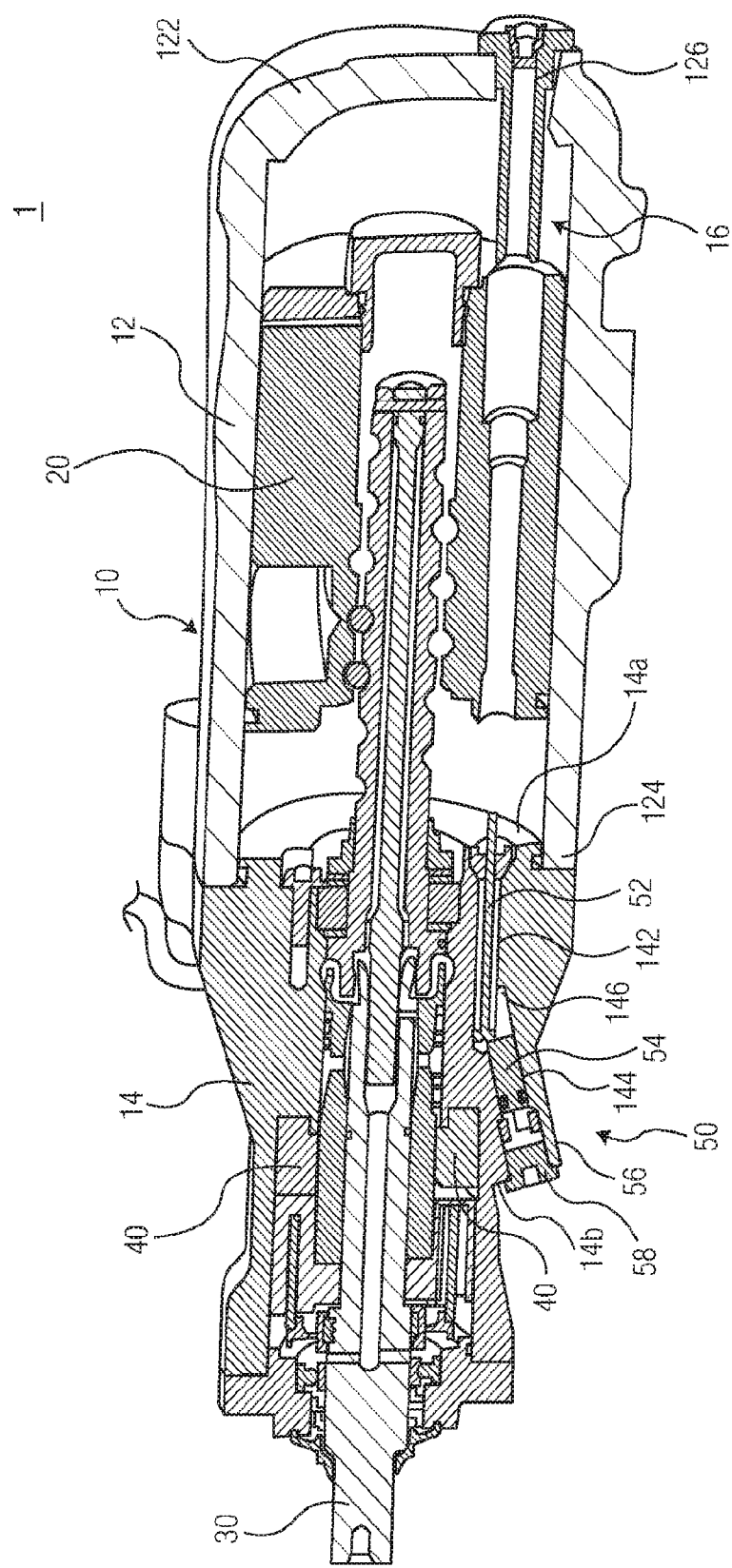
FIG. 2 is a sectional view of the power steering system according to the invention.

A power steering system 1 according to the invention is shown in FIG. 2. The power steering system 1 includes a housing 10, a piston 20, a steering shaft 30, a plurality of electronic components 40, and a plunger assembly 50. The major components of the invention will now be described in greater detail.

The housing 10, as shown in FIG. 2, includes a chamber body 12 and a bearing cap 14 attached to the chamber body 12 to define a chamber 16. The chamber 16 contains a hydraulic fluid.

The chamber body 12, as shown in FIG. 2, has a substantially enclosed first end 122 and an open second end 124. A bore 126 of the chamber body 12 extends horizontally through the first end 122, communicating between the chamber 16 and an area exterior of the housing 10.

Figure 3:
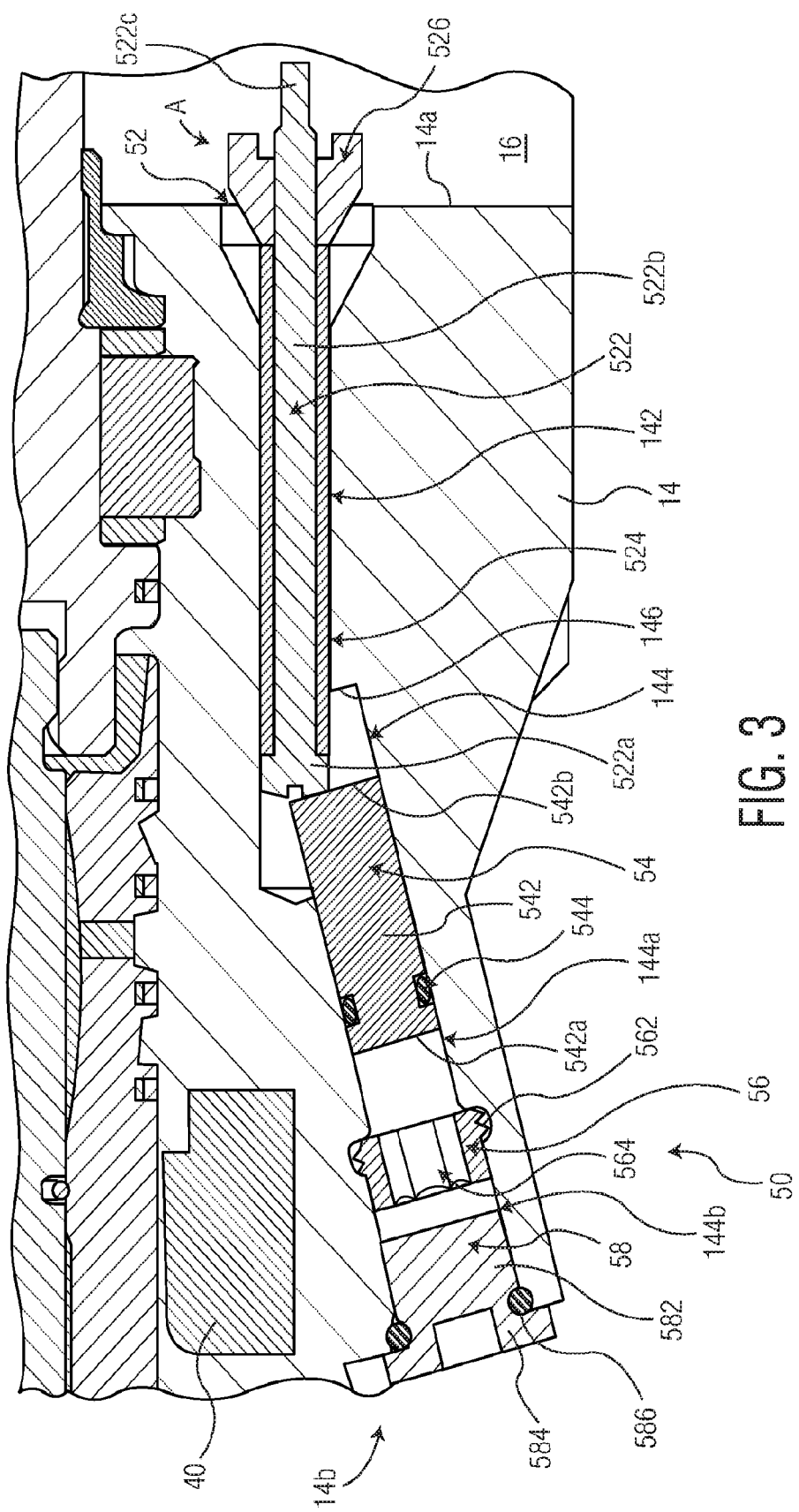
FIG. 3 is a detailed sectional view of a plunger assembly of the power steering system of FIG. 2 in an axle stop position.

The bearing cap 14, as shown in FIGS. 2 and 3, has a plunger passageway 142, a port 144, and a stop 146.

The plunger passageway 142, as shown in FIGS. 2 and 3, extends horizontally from a first side 14a of the bearing cap 14 adjacent the chamber 16 and into the bearing cap 14. The plunger passageway 142 extends partially into the bearing cap 14 and does not extend fully through the bearing cap 14.

The port 144, as shown in FIGS. 2 and 3, is disposed at an angle with respect to the plunger passageway 142 and communicates with the plunger passageway 142 and an area exterior of the housing 10 at a second side 14b of the bearing cap 14. The port 144 has a first port section 144a and second port section 144*b*. The first port section 144*a* communicates with the plunger passageway 142 and the second port section 144*b* communicates with the area exterior of the housing 10. As shown in FIG. 3, a diameter of the first port section 144*a* is smaller than a diameter of the second port section 144*b*. In an embodiment, the second port section 144*b* is threaded.

The stop 146, as shown in FIGS. 2 and 3, is a protrusion of the bearing cap 14 extending into the port 144 and is disposed at an end of the first port section 144*a* connected to the plunger passageway 142.

The piston 20, as shown in FIG. 2, is a cylindrical member disposed in the chamber 16. The piston 20 may be a known piston used in hydraulic power steering systems.

The steering shaft 30, as shown in FIG. 2, is an elongated member extending through the bearing cap 14 and into the chamber 16. The steering shaft 30 is rotatably held by the bearing cap 14. The steering shaft 30 may be a known steering shaft used in hydraulic power steering systems.

The plurality of electronic components 40 are shown in FIGS. 2 and 3. The electronic components 40 may be any type of electronic component used in a power steering system including sensors and controllers related, for example, to steering input via the steering shaft 30, the hydraulic fluid in the chamber 16, movement of the piston 12, or any other aspects of the power steering system 1. In the shown embodiment, the electronic components 40 are disposed within the bearing cap 14 concentrically around the steering shaft 30. A portion of the electronic components 40 is disposed adjacent an end of the plunger passageway 142 and above the port 144 in a vertical direction extending transverse to the steering shaft 30.

The plunger assembly 50, as shown in FIGS. 2 and 3, includes a plunger 52, a tappet 54, a hollow-lock set screw 56, and a port plug 58.

Figure 4:
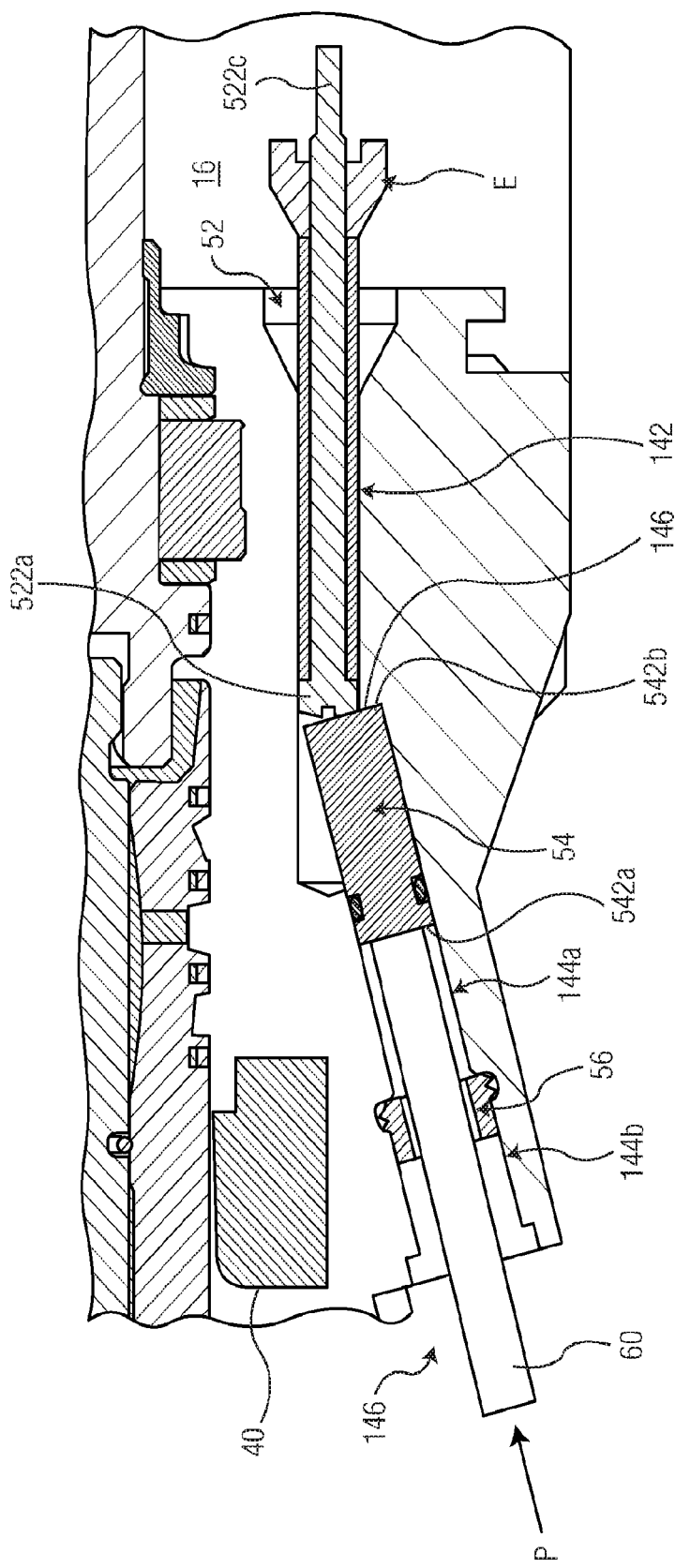
FIG. 4 is a detailed sectional view of the plunger assembly of FIG. 3 in an extended position.
Figure 5:
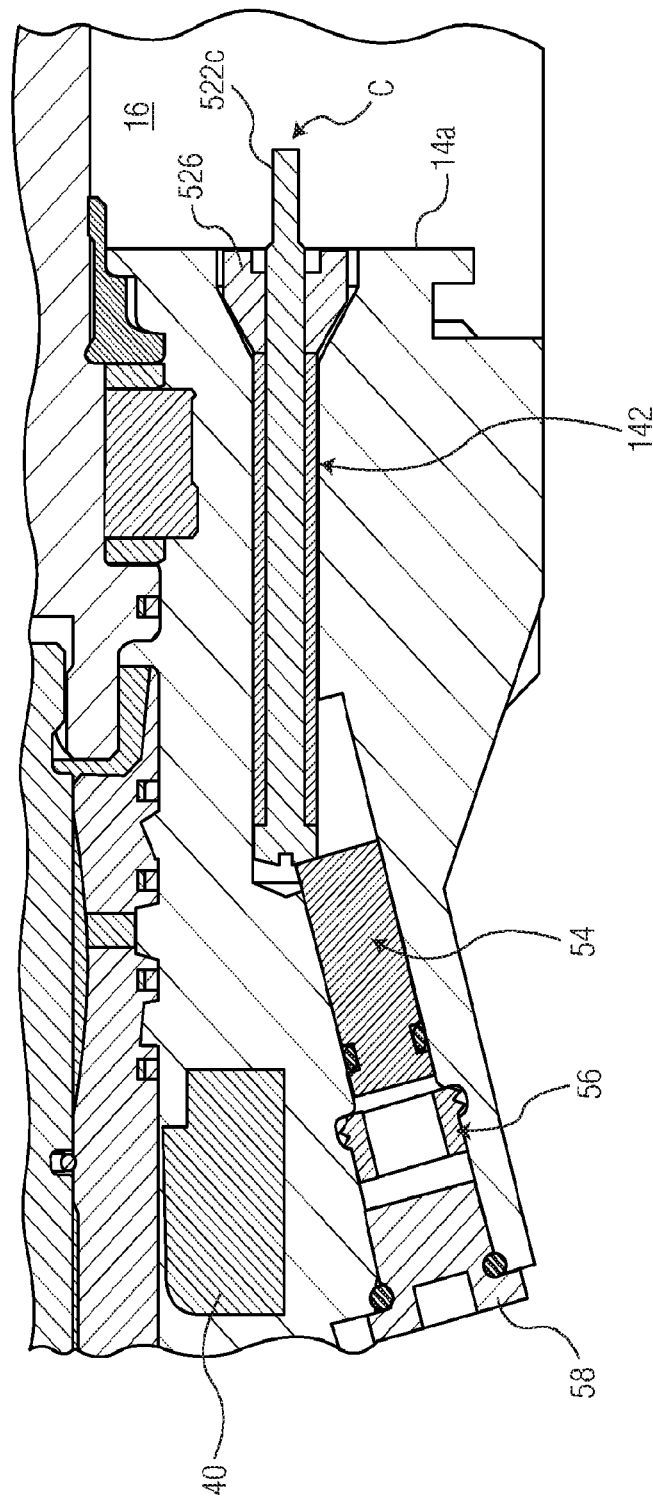
FIG. 5 is a detailed sectional view of the plunger assembly of FIG. 3 in a compressed position.

The plunger 52, as shown in FIG. 3, includes a plunger body 522, a spring pin 524, and a nut 526. The plunger 52 may be a known type of plunger used in hydraulic power steering systems. The plunger body 522 is cylindrical and has a head 522*a* at a first end, a central portion 522*b*, and a protrusion 522*c* at an opposite second end. As shown in FIG. 3, a diameter of the head 522*a* is greater than a diameter of the central portion 522*b*, and the diameter of the central portion 522 is greater than a diameter of the protrusion 522*c*. The spring pin 524 is formed of a rolled sheet of resilient material and is disposed circumferentially around the central portion 522. The nut 526 is disposed on the central portion 522*b* adjacent the protrusion 522*c*; in an embodiment, the nut 526 has threads engaging complementary threads on the central portion 522*b*, but one with ordinary skill in the art would understand that other fasteners could be used to attach the nut 526 to the central portion 522*c*. The spring pin 524 is disposed between and abuts both the head 522*a* and the nut 526. The protrusion 522*c*, as shown in FIGS. 3-5, protrudes beyond the nut 526 in a longitudinal direction of the plunger 52.

The tappet 54, as shown in FIG. 3, includes a tappet body 542 and a tappet O-ring 544. The tappet body 542 is a cylindrical member having a first end 542*a* and an opposite second end 542*b*. The tappet O-ring 544 is disposed circumferentially around the tappet body 542 adjacent the first end 542. The tappet O-ring 544 is formed of a resilient material such as rubber and may be any type of O-ring known to those with ordinary skill in the art.

The hollow-lock set screw 56, as shown in FIG. 3, is an annular member having outer threads 562 disposed along an outer circumference and a punch receiving passageway 564 extending through a center of the hollow-lock set screw 56.

The port plug 58, as shown in FIG. 3, has a plug body 582, a flange 584 disposed on an end of the plug body 582, and a port O-ring 586. The port plug 58 is formed from a metal material such as steel. In the shown embodiment, an outer surface of the plug body 582 is threaded. The port O-ring 586 is formed of a resilient material such as rubber and may be any type of O-ring known to those with ordinary skill in the art.

The assembly of the power steering system 1 will now be described in greater detail with reference to FIGS. 2 and 3.

The plunger 52 is assembled with the nut 526 attached to the central portion 522*b* and the spring pin 524 held between the head 522*a* and the nut 526, as shown in FIG. 3. Before the chamber body 12 is attached to the bearing cap 14, the plunger 52 is inserted into the plunger passageway 142 from the first side 14*a* of the bearing cap 14. When inserted, an outer diameter of the plunger 52 at the spring pin 524 is slightly larger than an inner diameter of the bore 142; the spring pin 524 extends beyond outer edges of the head 522*a*. The spring pin 524 frictionally engages the plunger passageway 142. The plunger 52 is longitudinally movable along the plunger passageway 142, but any movement force is at least partially counteracted by the frictional forces. Another plunger 52 may be similarly inserted into the bore 126.

The tappet 54 is then inserted into the port 144 and is disposed in the first port section 144*a*, as shown in FIG. 3. The tappet 54 has an outer diameter approximately equal to a diameter of the first port section 144*a* and is longitudinally movable along the first port section 144*a*. The tappet O-ring 544 maintains a seal with the first port section 144*a* as the tappet 54 moves along the first port section 144*a*. The hollow-lock set screw 56 is inserted into the port 144 after the tappet 54. The outer threads 562 of the hollow-lock set screw 56 engage the second port section 144*b* and the hollow-lock set screw 56 is inserted into the second port section 144*b* until it abuts an end of the first port section 144*a*. After the hollow-lock set screw 56 is inserted into the second port section 144*b*, the port plug 58 is inserted into the second port section 144*b* with the plug body 582 disposed in the second port section 144*b* and the flange 584 abutting the second side 14*b* of the bearing cap 14. The port O-ring 586 maintains a seal with the second port section 144*b* and, in the shown embodiment, the port plug 58 is held in the second port section 144*b* by threaded engagement.

As shown in FIG. 2, the steering shaft 30 is inserted through the bearing cap 14 and the piston 20 is inserted into the chamber 16. The front side 14*a* of the bearing cap 14 is then attached to the second end 124 of the chamber body 12 and the steering shaft 30 engages the piston 20. In the fully assembled power steering system 1, as shown in FIGS. 2 and 3, the protrusion 522*c* of the plunger 52 extends into the chamber 16.

The function and method of setting the plunger 52 of the power steering system 1 will now be described in greater detail with reference to FIGS. 2-5. The plunger 52 is initially set using the plunger assembly 50, is positioned by the piston 20 during use of the power steering system 1, and can then be re-set using the plunger assembly 50.

The initial setting of the plunger 52 to an extended position E using the plunger assembly 50 will now be described with reference to FIG. 4. The port plug 58 is first removed from the second port section 144*b*. The hollow-lock set screw 56 has an annular thickness which is greater than a difference between the diameter of the first port section 144*a* and the diameter of the second port section 144b; the tappet 54 can move along the first port section 144a but is stopped from entering the second port section 144b by the annular thickness of the hollow-lock set screw 56.

A punch 60, as shown in FIG. 4, is inserted into the second side 14b of the bearing cap 14, through the second port section 144b, through the punch receiving passageway 564, and into the first port section 144a to contact the first end 542a of the tappet body 542. A user moves the punch 60 along a direction P, correspondingly moving the tappet 54 along the first port section 144a. The second end 542b of the tappet body 542 contacts the head 522a and remains in contact with the head 522a while the tappet 54 moves. Motion of the tappet 54 along the first port section 144a moves the plunger 52 along the plunger passageway 142 in a direction toward the first side 14a of the bearing cap 14 and the chamber 16. The tappet 54 is movable by the punch 60 along the first port section 144a until the second end 542b of the tappet body 542 abuts the stop 146.

The plunger 52 is in the extended position E shown in FIG. 4 when the second end 542b of the tappet body 542 contacts the head 522a and the tappet 54 has been moved by the punch 60 such that the second end 542b also contacts the stop 146. In the extended position E, the protrusion 522c extends a furthest distance into the chamber 16. The punch 60 is removed and the port plug 58 is re-inserted into the second port section 144b once the plunger 52 is in the extended position E.

During use of the power steering system 1, the piston 20, shown in FIG. 2, moves along the chamber 16 by rotational movement of the steering shaft 30 as a vehicle driver turns a steering wheel (not shown) connected to the steering shaft 30. Motion of the piston 20 is aided by asymmetric hydraulic pressure within the chamber 16 on each side of the piston 20.

To set a position of the plunger 52, with the plunger 52 in the extended position E and wheels of a vehicle having the power steering system 1 held off the ground, the vehicle driver turns the steering wheel connected to the steering shaft 30 until an axle (not shown) reaches an axle stop without hydraulic pressure. Motion of the steering shaft 30 moves the piston 20 along the chamber 16, and the piston 20 engages the nut 526 and pushes the plunger 52 into the plunger passageway 142 until the axle reaches the axle stop. Motion of the plunger 52 into the plunger passageway 142 also moves the tappet 54 along the first port section 144a but the tappet 54 is held in the first port section 144a by the hollow-lock set screw 56.

When the axle reaches the axle stop, the piston 20 positions the plunger 52 at an axle stop position A in the plunger passageway 142 shown in FIG. 3. For every subsequent movement of the piston 20, with the wheels of the vehicle on the ground and the hydraulic pressure within the chamber 16 applied, the plunger 52 remains in the axle stop position A and the piston 20 reaches an end of travel at which a valve of the piston 20 only engages the protrusion 522c. The protrusion 522c engages the piston 20 to relieve the hydraulic pressure within the chamber 16 and prevent the axle from reaching the axle stop, and correspondingly, the piston 20 from reaching the nut 526, under hydraulic pressure.

The axle stop position A is a position between the extended position E shown in FIG. 4 and a compressed position C of the plunger 52 shown in FIG. 5. In the compressed position C, the nut 526 abuts the plunger passageway 142 adjacent the first side 14a of the bearing cap 14 and the protrusion 522c extends a shortest distance into the chamber 16. The precise position of the axle stop position A between the compressed position C and the extended position E depends on axle stop settings and tire sizes of a vehicle incorporating the power steering system 1. The axle stop position A may be co-located with the extended position E or the compressed position C.

The axle stop position A of the plunger 52 within the plunger passageway 142 must be reset when axle stop settings or tire sizes of the vehicle are changed. To reset the plunger 52, the port plug 58 is removed from the second port section 144b and the punch 60 is used to move the plunger 52 to the extended position E as described above. The port plug 58 is replaced and the piston 20 then moves the plunger 52 to a new axle stop position A during use of the power steering system 1.

Advantageously, in the power steering system 1 having the plunger assembly 50 according to the invention, the positioning of the port 144 with respect to the plunger passageway 142 and the use of the tappet 54 permit the plunger 52 to be reset to the extended position E even when electronic components 40 prevent the plunger passageway 142 from extending fully through the bearing cap 14 in the horizontal direction. The use of the tappet 54 also prevents the punch 60 from directly contacting the plunger 52, avoiding damage and potential impairment of plunger 52 function. Additionally, the stop 146 limits the motion of the tappet 54 and prevents the tappet 54 from contacting an edge of the plunger passageway 142, further avoiding damage and potential impairment of plunger 52 function.

What is claimed is:

1. A plunger assembly for a power steering system, comprising:
    a plunger disposed within and longitudinally movable along a plunger passageway in a housing of the power steering system; and
    a tappet disposed within and longitudinally movable along a port defined by the housing, the port disposed at an angle with respect to the plunger passageway within the housing and communicating with the plunger passageway and an area exterior of the power steering system;
    wherein the tappet abuts the plunger and movement of the tappet along the port imparts movement to the plunger along the plunger passageway.

2. The plunger assembly of claim 1, wherein the port includes a first port section communicating with the plunger passageway and a second port section communicating with the area exterior of the power steering system, and wherein a diameter of the first port section is smaller than a diameter of the second port section.

3. The plunger assembly of claim 2, wherein a stop is formed by the housing at a first end of the first port section connected to the plunger passageway.

4. The plunger assembly of claim 3, further comprising a hollow-lock set screw disposed in the second port section and abutting a second end of the first port section opposite the plunger passageway, the hollow-lock set screw having a punch receiving passageway extending through a center of the hollow-lock set screw.

5. The plunger assembly of claim 4, further comprising a port plug having a plug body and a flange disposed on an end of the plug body, the port plug is removably insertable into the second port section such that the plug body is disposed in the second port section and the flange abuts an exterior side of the housing.

6. The plunger assembly of claim 3, wherein the plunger includes a plunger body having a head at a first end, a central portion, and protrusion at a second end opposite the first end, a spring pin disposed circumferentially around the central portion, and a nut disposed on the central portion adjacent the protrusion.

7. The plunger assembly of claim 6, wherein the tappet abuts the head of the plunger body, the spring pin frictionally engages the plunger passageway, and the protrusion of the plunger body extends into a chamber of the power steering system.

8. The plunger assembly of claim 4, further comprising a punch insertable into the first port section though the second port section and the punch receiving passageway of the hollow-lock set screw.

9. The plunger assembly of claim 8, wherein the punch contacts the tappet to longitudinally move the tappet along the first port section.

10. The plunger assembly of claim 9, wherein the longitudinal movement of the tappet along the first port section is limited by the stop at a first end of the first port section and by the hollow-lock set screw at the second end of the first port section.

11. The plunger assembly of claim 10, wherein, in an extended position in which the plunger extends a furthest distance into a chamber of the power steering system, the tappet abuts the plunger and the stop.

12. The plunger assembly of claim 11, wherein, in a compressed position in which the plunger extends a shortest distance into the chamber, the tappet abuts the plunger and is disposed adjacent the hollow-lock set screw.

13. A power steering system, comprising:
a housing having a chamber body and a bearing cap attached to the chamber body to define a chamber, the bearing cap having a plunger passageway and a port disposed at an angle with respect to the plunger passageway, the plunger passageway communicating with the chamber and the port communicating with the plunger passageway and an area exterior of the power steering system;
a piston disposed in the chamber;
a steering shaft extending through the bearing cap and into the chamber, rotational movement of the steering shaft moving the piston along the chamber; and
a plunger assembly including a plunger disposed within and longitudinally movable along the plunger passageway and a tappet disposed within and longitudinally movable along the port;
wherein the tappet abuts the plunger and movement of the tappet along the port imparts movement to the plunger along the plunger passageway.

14. The power steering system of claim 13, further comprising a plurality of electronic components disposed within the bearing cap adjacent an end of the plunger passageway and above the port in a vertical direction extending transverse to the steering shaft.

15. The plunger assembly of claim 13, wherein the plunger includes a plunger body having a head at a first end, a central portion, and protrusion at a second end opposite the first end, a spring pin disposed circumferentially around the central portion, and a nut disposed on the central portion adjacent the protrusion.

16. The plunger assembly of claim 15, wherein the protrusion of the plunger extends into the chamber in both an extended position in which the plunger extends a furthest distance into the chamber and a compressed position in which the plunger extends a shortest distance into the chamber.

17. The plunger assembly of claim 16, wherein the piston contacts the nut of the plunger to move the plunger within the plunger passageway to an axle stop position between the extended position and the compressed position, the piston only engaging the protrusion of the plunger when the plunger is in the axle stop position.

18. A method of setting a plunger of a power steering system, comprising:
providing the power steering system including:
a housing having a chamber body and a bearing cap attached to the chamber body to define a chamber, the bearing cap having a plunger passageway and a port disposed at an angle with respect to the plunger passageway, the plunger passageway communicating with the chamber and the port communicating with the plunger passageway and an area exterior of the power steering system;
a piston disposed in the chamber;
a steering shaft extending through the bearing cap and into the chamber; and
a plunger assembly including a plunger disposed within the plunger passageway and a tappet disposed within the port and abutting the plunger;
inserting a punch into the port to contact the tappet and longitudinally move the tappet along the port until the tappet reaches a stop at an end of the port connected to the plunger passageway, movement of the tappet to the stop imparting longitudinal movement of the plunger along the plunger passageway into an extended position in which the plunger extends a furthest distance into the chamber;
rotating the steering shaft to move the piston along the chamber into contact with the plunger; and
pushing the plunger along the plunger passageway with the piston to position the plunger at an axle stop position between the extended position and a compressed position in which the plunger extends a shortest distance into the chamber.

* * * * *